United States Patent Office.

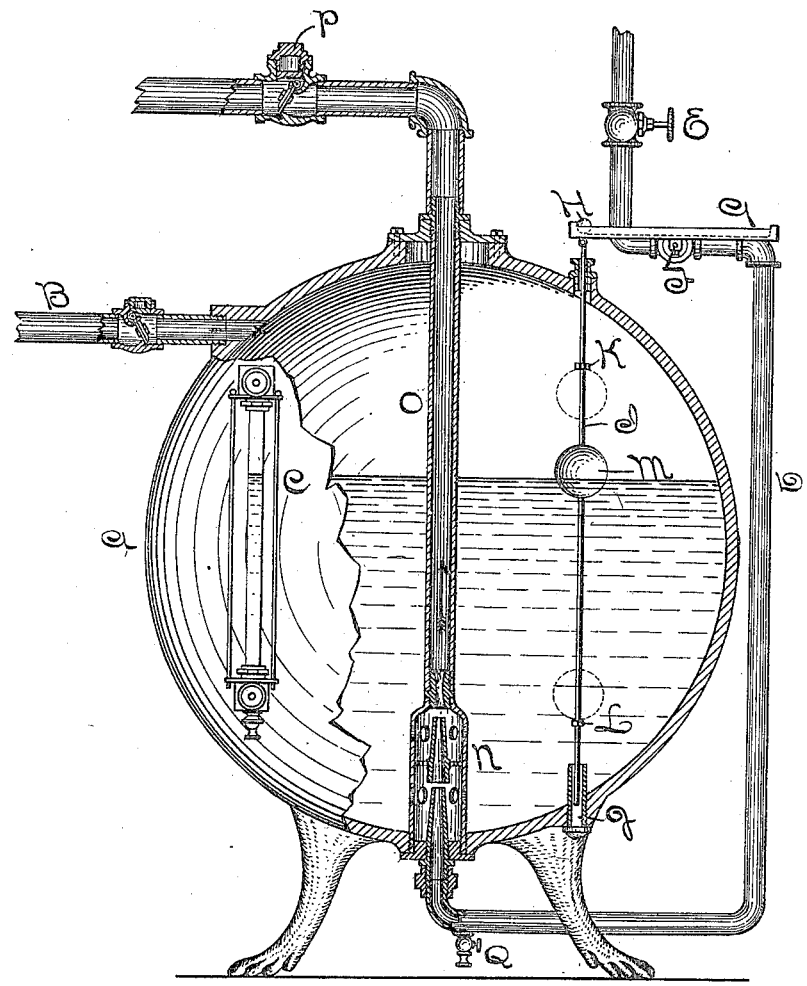

WILLIAM D. LABADIE, OF SOUTH BEND, INDIANA, ASSIGNOR OF ONE-HALF TO JOSEPH G. DUCK, OF MILWAUKEE, WISCONSIN.

EJECTOR FOR STEAM-TRAPS.

SPECIFICATION forming part of Letters Patent No. 680,718, dated August 20, 1901.

Application filed December 19, 1900. Serial No. 40,459. (No model.)

*To all whom it may concern:*

Be it known that I, WILLIAM D. LABADIE, a citizen of the United States, residing at South Bend, in the county of St. Joseph and State of Indiana, have invented certain new and useful Improvements in Ejectors for Steam-Traps; and I do hereby declare the following to be a full, clear, and exact description of the invention, such as will enable others skilled in the art to which it appertains to make and use the same.

The object of my invention is to provide a means for trapping the water of condensation and when the trap has become filled to a predetermined point to automatically turn on the steam, so as to drive the water of condensation back into the boiler, and as soon as the water in the trap has been lowered to another predetermined point to automatically cut off the steam.

My invention consists in a steam-trap and an injector placed therein, combined with automatic means for turning on and shutting off the steam as soon as the water of condensation reaches certain predetermined points, as will be more fully described hereinafter.

The accompanying drawing represents a side elevation of a trap embodying my invention, partly in section.

A represents a trap of any suitable shape, size, or construction that may be preferred and which has the valved pipe B connected to its upper portion for conveying to the trap the water of condensation. To this trap is also connected a gage C for showing the amount of water contained in the trap.

Connected to the bottom of the trap A is the steam-pipe D, which is provided with the valve E, by means of which the flow of the steam to the trap is cut off or turned on by hand, and a second valve F, which is automatically operated by the lever G, which is connected at its center to the outer end of the stem of the valve, as shown. This lever is grooved upon its upper edge, and in this groove is placed a rolling weight H, which in rolling from one end of the lever to the other causes the lever to turn on or shut off the flow of steam through the pipe D to the trap. Connected to one end of this lever G is the rod or wire I, which extends vertically through the trap at any suitable point and which rod or wire has its upper end connected to the inner end of the lever G. In the lower portion of the trap is placed a sleeve or socket J, which receives the lower end of the rod or wire I for the purpose of guiding it in its movements, and to the rod or wire are secured the two adjustable collars K L, and which collars K L regulate the height to which the water shall rise in the trap before the steam is turned on and the injector is started into operation and the point to which the water is emptied from the trap before the steam is cut off from the injector. Placed upon this rod or wire I is a float M, which slides vertically upon the rod, and which float moves the rod I vertically when it strikes against either one of the collars K or L, and thus tilts the lever G for the purpose of operating the valve F.

Placed inside of the bottom of the trap and connected directly with the steam-pipe D is an injector N, by means of which the water of condensation is forced back into the boiler through the pipe O or to any other desired source, the pipe O being provided with a valve P to prevent the return of the water into the trap.

As soon as the trap has become filled with the water of condensation through the pipe B, so that the float strikes against the collar K, the rod or wire I is raised, and it tilts the lever G at such an angle that the weight H rolls down to the outer end of the lever, thus imparting a positive movement to the lever, and the valve F is operated so as to automatically turn on the steam, which operates the injector and empties the trap until the float M descends and strikes against the collar L, when the inner end of the lever G is tilted downward, when the rolling of the ball back to the position shown causes the valve F to be operated so as to shut off the flow of steam through the pipe D.

Also connected to the lower portion of the pipe D is a valve Q, through which the trap and the pipe D can be emptied when so desired.

Having thus described my invention, I claim—

1. A trap, a pipe connected thereto for conveying the water of condensation to the trap, a steam-pipe connected to the trap, an injector connected to the steam-pipe, and a pipe connected to the injector for carrying away the water of condensation, combined with a rod, or wire, provided with collars, a vertically-moving float placed upon the rod or wire, and a tilting lever connected to a valve in the steam-pipe, and which valve is operated by the rise and fall of the float, substantially as shown.

2. The trap, the pipe B connected thereto, the steam-pipe D, provided with the valve E, an injector placed in the lower part of the trap, and connected to the lower end of the steam-pipe, and the pipe O connected to the injector for carrying away the water of condensation, combined with a vertically-moving rod or wire, collars K L secured to the wire, a float placed upon the rod or wire and which rises and falls between the two collars, a tilting weighted lever connected to the upper end of the rod or wire and to the valve F in the steam-pipe, substantially as specified.

3. In an ejector for steam-traps, a chamber to receive the water of condensation, a steam-pipe connected to the chamber, an injector connected to the steam-pipe, and a pipe connected to the injector for ejecting the water of condensation, combined with a float, a valve operated by said float which controls the admission of the steam to the ejector, and means for holding said valve in an open or closed position for a predetermined time.

In testimony whereof I affix my signature in presence of two witnesses.

WILLIAM D. LABADIE.

Witnesses:
GEORGE OLTSCH,
HUGO OLTSCH.